United States Patent
Kaji et al.

[11] 3,895,372
[45] July 15, 1975

[54] QUICK RESPONSE LIQUID CRYSTAL DISPLAY DEVICE

[75] Inventors: Tetsunori Kaji; Masakazu Fukushima, both of Kokubunji; Isamu Mitomo, Hachioji; Shigehiro Kamejima, Ome, all of Japan

[73] Assignee: Hitachi, Ltd., Japan

[22] Filed: Jan. 23, 1974

[21] Appl. No.: 435,951

[30] Foreign Application Priority Data
Jan. 24, 1973 Japan.................................. 48-9510

[52] U.S. Cl......... 340/324 M; 340/336; 350/160 LC
[51] Int. Cl. ........................... G09f 9/32; G02f 1/18
[58] Field of Search........... 350/160 LC; 340/324 R, 340/324 M, 336

[56] References Cited
UNITED STATES PATENTS
3,760,406  9/1973  Walton ............................... 340/336
3,786,486  1/1974  Torresi ......................... 350/160 LC
3,787,834  1/1974  Elliott............................. 340/324 M
3,820,108  6/1974  Luce............................. 350/160 LC

*Primary Examiner*—Marshall M. Curtis
*Attorney, Agent, or Firm*—Craig & Antonelli

[57] ABSTRACT

In a liquid crystal display panel driving device including a display panel having thereon a matrix of liquid crystal cells to which time-division signals for excitation are applied respectively, there are provided means for detecting the variation of display information and means for applying, at least to a liquid crystal cell corresponding to the variation position of the display information, a signal for sufficiently exciting the liquid crystal cell when the variation of the display information is detected by the detecting means, whereby the liquid crystal cell is forced to a sufficiently excited state.

10 Claims, 14 Drawing Figures

3,895,372

F I G. 11
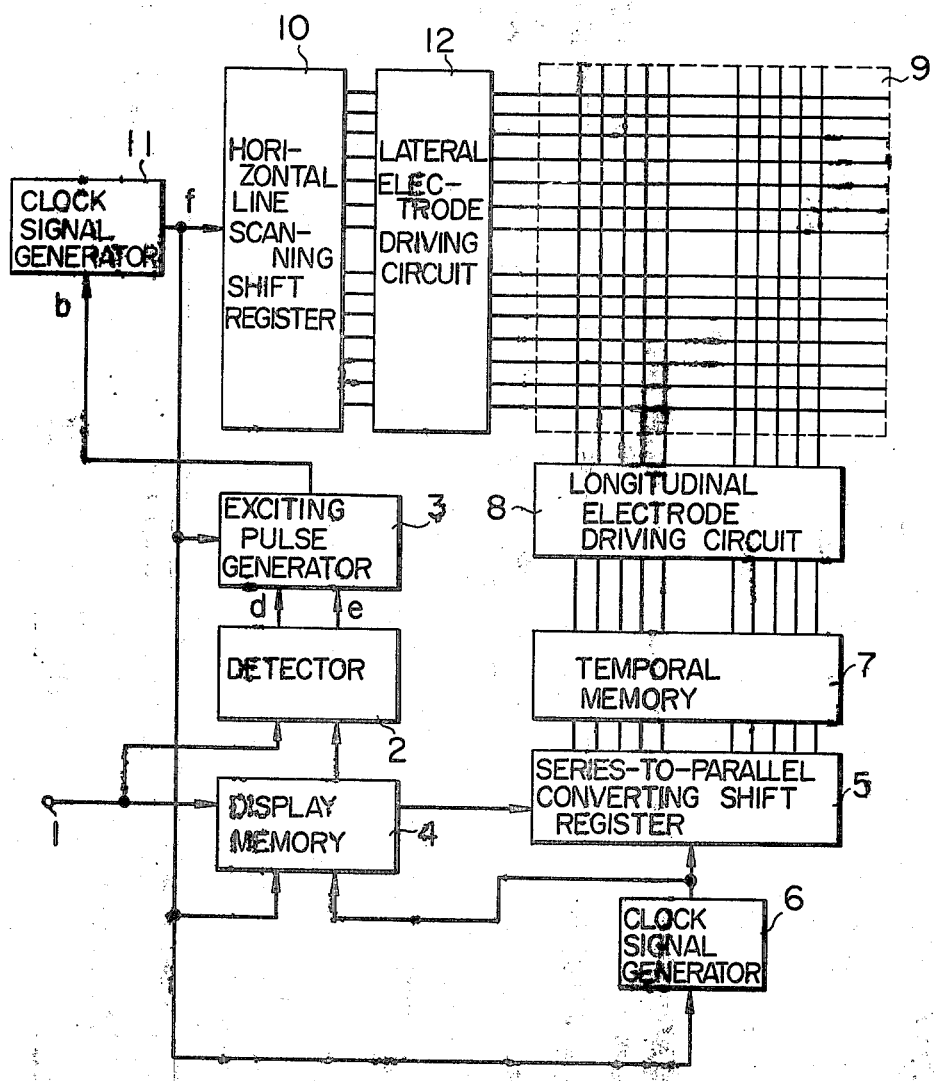

QUICK RESPONSE LIQUID CRYSTAL DISPLAY DEVICE

BACKGROUND OF THE INVENTION

The present invention relates to a display panel driving device including a liquid crystal.

For this kind of liquid crystal display panel driving device, there has been known a device including a plurality of liquid crystal cells to which electrical signals are applied in time-division fashion.

In such a device, lateral electrodes and longitudinal electrodes crossing therewith are disposed on a display panel so that a liquid crystal cell is formed at each intersection of the lateral and longitudinal electrodes. The time-division signals are applied to the lateral and longitudinal electrodes to excite only the liquid crystal cells lying on the intersections of the lateral and longitudinal electrodes to which the signals are simultaneously applied.

In general, the liquid crystal has the characteristic that a period of time required for its change from a non-excited state to a sufficiently excited state is shorter than that required for its change from the excited state to the non-excited state.

For this reason, if the liquid crystal cell is excited by a time-division pulse signal having a smaller cuty $\tau_w/\tau_R$ ($\tau_w$ being a pulse duration and $\tau_R$ being a pulse repetition period), then the cell is sufficiently excited by applying a plurality of pulses thereto even in the case where it is not sufficiently excited by one pulse.

However, much information to be displayed on the liquid crystal display panel leads to a very small duty $\tau_w/\tau_R$, for example, 1/100 or 1/1000 and hence it sometimes takes much time, for example, 1 to 10 seconds for a predetermined liquid crystal to be sufficiently excited with the disadvantageous result of slow response.

SUMMARY OF THE INVENTION

An object of the present invention is to provide a liquid crystal display panel driving device in which a response time from the input of display information to its display is made short in the case of a very small duty.

In order to attain such an object, the liquid crystal display driving device of the present invention comprises means for detecting the variation of information to be displayed and means for applying at least to a liquid crystal cell corresponding to a position of the information a pulse for sufficiently exciting the liquid crystal cell depending upon the result of detection by the detecting means, thereby the liquid crystal cell being forced to a sufficiently excited state.

BRIEF DESCRIPTION OF THE DRAWING

FIG. 11 is an arrangement view showing further another embodiment of a liquid crystal display panel driving device according to the present invention.

DETAILED DESCRIPTION OF THE INVENTION

Figure 1:
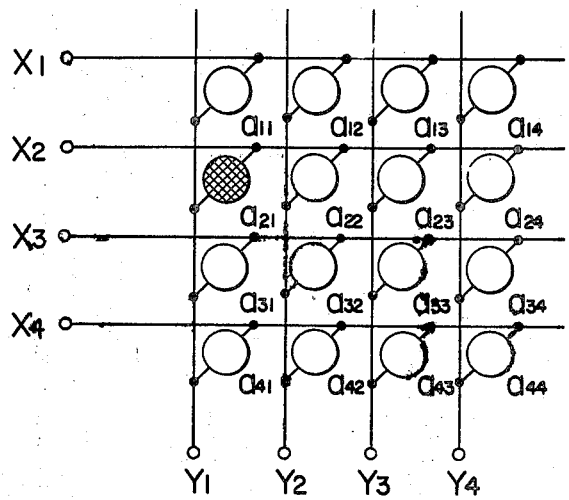
FIGS. 1 and 2 are views showing examples of a basic equivalent circuit of a liquid crystal display panel, respectively.

FIG. 1 shows one form of a basic equivalent circuit of a liquid crystal display panel used in such a liquid crystal display panel driving device. The display panel includes lateral electrodes $X_1$ to $X_4$ and longitudinal electrodes $Y_1$ to $Y_4$, at the intersections of which liquid crystal cells $a_{11}, a_{12}, \ldots, a_{44}$ are formed respectively.

Figure 2:
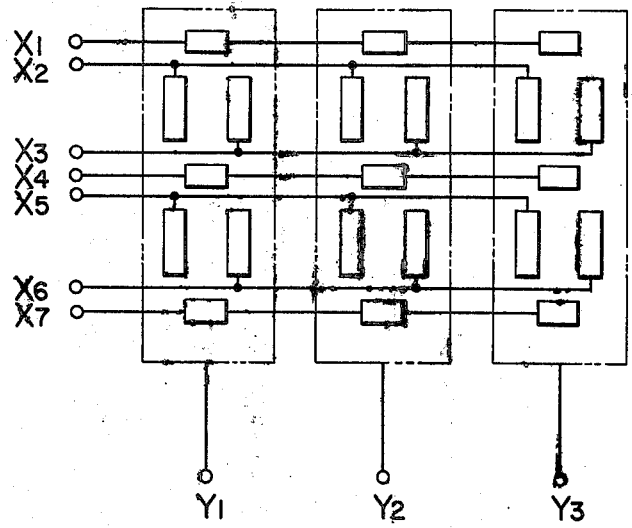

Further, for the liquid crystal display panel there has been known a panel, as shown in FIG. 2, on which liquid crystal cells of a segment type are disposed on predetermined positions for segmented numerical display.

Figure 3:
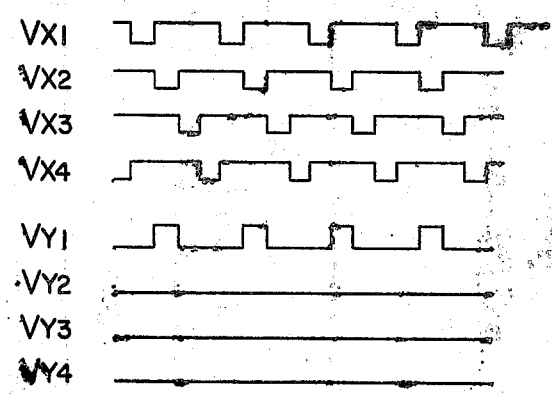
FIG. 3 is a waveform view of signals for driving the panel of FIG. 1.

FIG. 3 shows the waveforms of signals for driving sixteen liquid crystal cells shown in FIG. 1. $V_{x1}$ to $V_{x4}$ indicate the waveforms of voltages applied to the lateral electrodes $X_1$ to $X_4$, respectively. $V_{Y1}$ to $V_{Y4}$ indicate the waveforms of voltages applied to the longitudinal electrodes $Y_1$ to $Y_4$, respectively.

In the figure, only the liquid crystal cell $a_{21}$ is shown as excited. That is, time-division signals are applied in succession to the lateral electrodes $X_1$ to $X_4$, and a voltage $V_{Y1}$ in synchronism with a voltage $V_{x2}$ of the lateral electrode $X_2$ is applied only to the longitudinal electrode $Y_1$ in the electrodes $Y_1$ to $Y_4$ which corresponds to the liquid crystal cell $a_{21}$. As a result, only the liquid crystal cell $a_{21}$ receives a sum voltage of $V_{x2}$ and $V_{Y1}$ and is excited, but all the other liquid crystal cells receive only the voltage of the lateral electrode and are not excited.

Figure 4A:
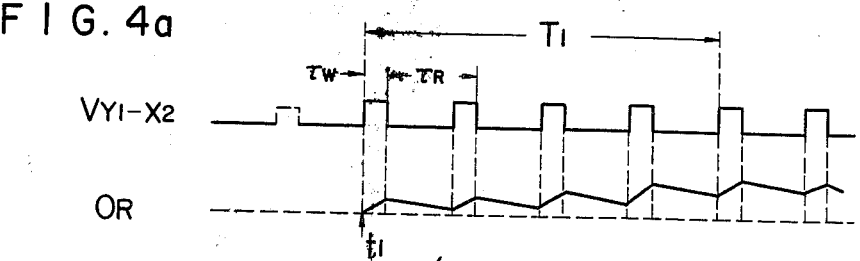
FIGS. 4a, 4b and 4c are waveform views of signals for illustrating the principles of the prior art and the present invention, respectively.

FIG. 4a shows a voltage $V_{Y-X}$ applied to the liquid crystal cell $a_{21}$ which is intended for excitation as mentioned above, and an optical response OR of the liquid crystal cell $a_{21}$ at the time of excitation. Prior to a time $t_1$ the liquid crystal $a_{21}$ is excited with only the half-selective voltage as shown by a dotted line being applied to the liquid crystal cell $a_{21}$, but at a time following the time $t_1$ a voltage as shown by a solid line is applied to the liquid crystal cell $a_{21}$ so that the cell $a_{21}$ is excited.

In general, the liquid crystal cell has the characteristic that the time required for its change from a non-excited state to a sufficiently excited state is shorter than that required for its change from the excited state to the non-excited state.

For this reason, if the liquid crystal cell is excited by the voltage having a smaller duty $\tau_w/\tau_R$ ($\tau_w$ being a pulse duration and $\tau_R$ being a pulse repetition period,) then the cell is sufficiently excited by applying a plurality of pulses even in a case where it is not sufficiently excited.

For example, in the case of FIG. 4a, the time required for its change from the non-excited state to the excited state is $T_1$.

When much information is displayed on the liquid crystal display panel with many lateral and longitudinal electrodes, duty $\tau_w/\tau_R$ becomes a greatly small value, for example, 1/100 or 1/1000. Hence it sometimes takes much time, for example, 1 to 10 seconds for the predetermined liquid cell to be sufficiently excited with the disadvantageous result of slow response.

Figure 4B:
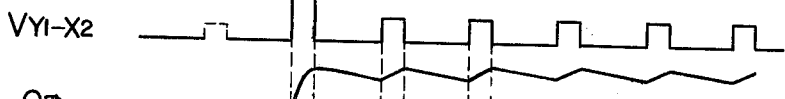
Figure 4C:
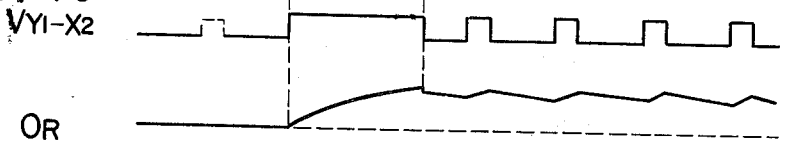

FIGS. 4b and 4c show waveforms for illustrating the principle of the present invention.

As will be understood from the figures, a pulse having a larger amplitude but the same duration is applied to a corresponding liquid crystal cell only during pulse duration $\tau_w$ from time when input display information has varied as shown in FIG. 4b, or a pulse having the same amplitude but a longer duration is applied thereto as shown in FIG. 4c. Further, a pulse having a large amplitude and a longer duration may be applied to the liquid crystal cell. Each of such pulses has a level high enough for driving the liquid crystal cell to be excited so that the liquid crystal cell is driven into sufficiently excited state in the short time $T_1'$ or $T_1''$ as shown in FIGS. 4a and 4b.

In the above description, when input information varies, only the liquid crystal cell corresponding to the variation position of the input information is compulsively excited. However, liquid crystal cells over a certain area including the cell corresponding to the variation position of the input information may be excited simultaneously. For example, the whole cell of the display panel may be excited simultaneously when the input information varies. In this case, unnecessary portions are turned out to be excited temporally, but this fact leads to no drawback because it generally takes only less than one second for a liquid crystal to change from its excited state to its non-excited state. Also, such a system is advantageous in the case where a motionless image is changed for display at each predetermined time interval, as seen in a numerical display.

Embodiments of the present invention will be now described in detail in conjunction with the accompanying drawings.

Figure 5:
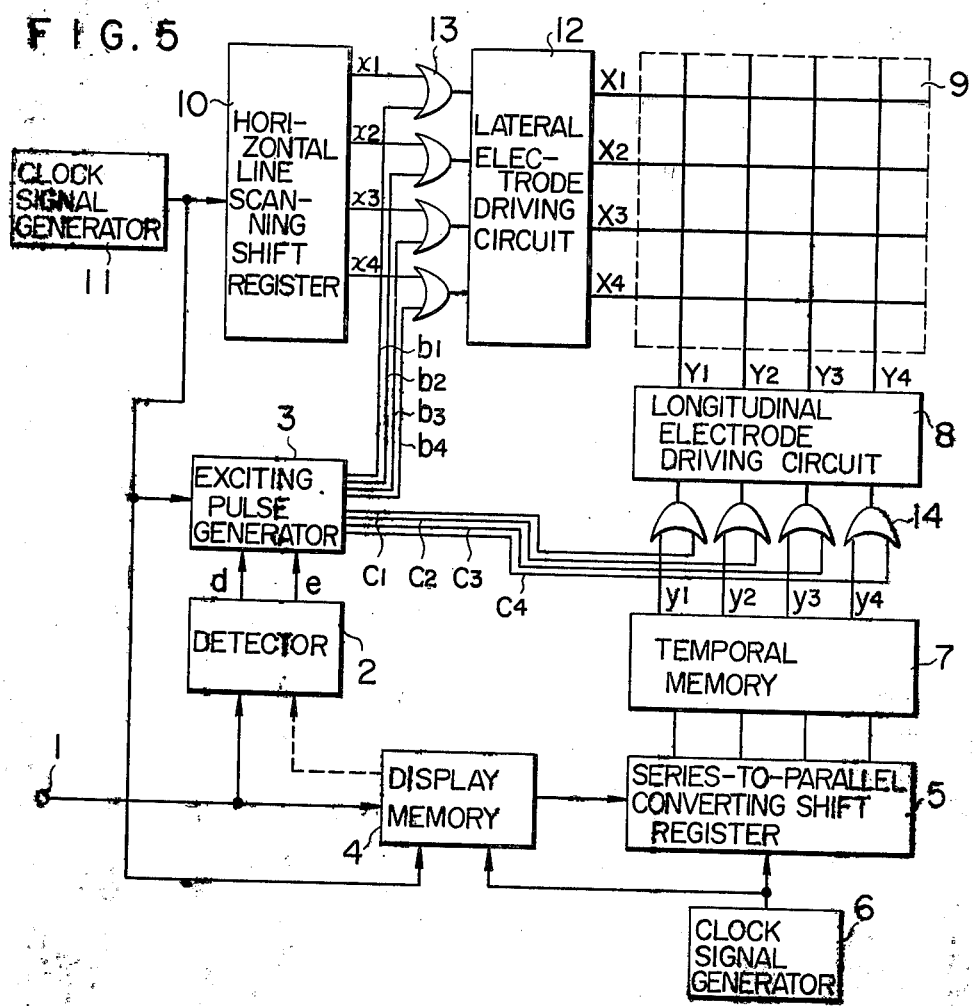
FIG. 5 is an arrangement view showing one embodiment of a liquid crystal display panel driving device according to the present invention.

In FIG. 5 there is shown an arrangement of one embodiment of a liquid crystal display panel driving device according to the present invention, which comprises an input signal receiving terminal 1, a detector 2 for detecting the variation of an input display signal, an exciting pulse generator 3, a display memory 4, a serial-to-parallel converting shift register 5, a clock signal generator 6 for the serial-to-parallel converting shift register, a temporal memory 7, a longitudinal electrode driving circuit 8, a liquid crystal display panel 9, a horizontal line scanning shift register 10, a clock signal generator 11 for the horizontal line scanning shift register 10, a lateral electrode driving circuit 12, and OR gates 13 and 14.

In the case of a character display, an input signal applied to the input terminal 1 includes a strobe signal generated upon reception of a new character as well as a signal representative of the character and a signal representative of a position of the character, so that the detector 2 is adapted to detect the presence or absence of the strobe signal. Further, in the case of an usual image display, the detector 2 is adapted to detect the presence or absence of the strobe signal when image information to be displayed varies. It will, further, be apparent that the detector 2 may detect the presence or absence of the input signal when the latter is applied only when the image information to be displayed varies.

It is noted that the detector 2 may be provided with the function of detecting the position of the input display signal as required.

In this arrangement, a clock signal from the clock signal generator 11 causes the horizontal line scanning shift register 10 to be driven in a normal state to generate outputs $x_1$ to $x_4$ which are in turn applied to the lateral electrode driving circuit 12 through the OR gates 13. The driving circuit 12 applies time-division voltages $V_X$ to $V_X$ as shown in FIG. 3 to lateral electrodes $X_1$ to $X_4$ of the liquid crystal panel 9, respectively.

On the other hand, the input signal from the input receiving terminal 1 is stored in the display memory 4 and transmitted to the serial-to-parallel converting shift register 5 in a predetermined order in response to the clock signal from the clock signal generator 6. The signals parallel-converted by the serial-to-parallel converting shift register 5 are stored temporally on the memory 7 to transmit outputs $y_1$ to $y_4$ to the longitudinal electrode driving circuit 8 through the OR gates 14, and then to apply voltages $V_Y$ to $V_Y$ as shown in FIG. 3 to longitudinal electrodes $Y_1$ to $Y_4$ of the liquid crystal display panel 9, respectively.

The input signal from the input receiving terminal 1 is applied also to the detector 2. When the detector 2 detects the variation of the input display signal, it generates a signal $d$ representative of the variation of the display signal and an indicating signal $e$ representative of the position of the variation, and sends them to the exciting pulse generator 3.

The exciting pulse generator 3 generates exciting pulse $b_1$ to $b_4$ and $c_1$ to $c_4$ which are in turn applied to the lines of the driving circuits 12 and 8 through the OR gates 13 and 14, respectively. The voltages from these driving circuits 12 and 8 are applied to predetermined electrodes of the liquid crystal display panel 9.

Figure 6:
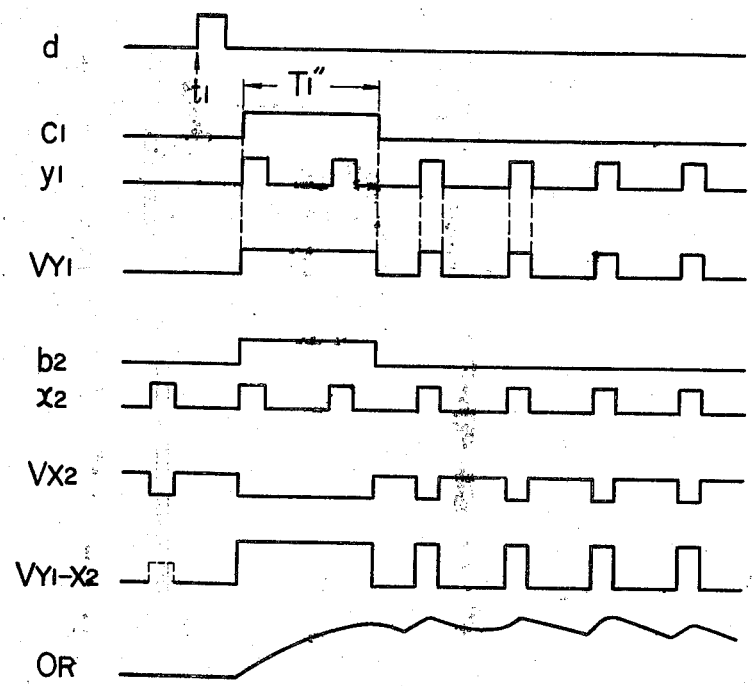
FIG. 6 is a waveform view of signals for illustrating the operation of FIG. 5.

The waveforms of voltages for illustrating the operation of the driving device of FIG. 5 are shown in FIG. 6 in which the liquid crystal panel 9 is not excited in the whole cell prior to a time $t_1$ and only the liquid crystal cell $a_{21}$ of FIG. 1 is excited subsequent to the time $t_1$.

In the figure, $d$ shows a signal representative of the variation of the display signal, $c_1$ and $b_2$ exciting signals from the exciting pulse generator 3, $y_1$ and $x_2$ output signals from the memory 7 and shift register 10, $V_Y$ a voltage applied to the longitudinal electrode $Y_1$, $V_X$ a voltage applied to the lateral electrode $X_2$, $V_Y - _X$ a terminal voltage across the liquid crystal cell $a_{21}$, and OR an optical response of the liquid crystal cell $a_{21}$.

It is to be noted that in the above embodiment no exciting signals $b_1$, $b_3$, $b_4$, $c_2$, $c_3$ and $c_4$ are generated.

When the pulse having a longer duration is thus applied to the liquid crystal cell corresponding to the variation position of the input display signal, the liquid crystal cell can be excited in a short time.

In FIG. 6, the pulse having the longer duration has been shown as being applied only to the cell which received the variation of the input display signal, but it will be appreciated that the liquid crystal cells only in one row can be excited by generating signals $b_1$, $b_3$ and $b_4$ which are the same as the signal $b_2$ of FIG. 6, and that the liquid crystal cells on the whole cell of the liquid crystal display panel 9 can be excited by generating the signals $c_2$, $c_3$ and $c_4$ which are the same as the signal $c_1$ of FIG. 6. In the case of the excitation of the whole cell of the panel, the position indicating signal $e$ in FIG. 5 is not required and the exciting pulse generator 3 has only to generate the same signals, thereby making the entire system greatly simple.

It is to be noted that the display memory 4 can be omitted depending upon the kind of the input signal.

An embodiment in which the liquid crystal cell is excited upon variation of the input display signal by making the amplitude of the pulse larger instead of making the duration thereof longer is substantially the same as that shown in FIGS. 5 and 6, except the difference of the arrangement of the driving circuits 12 and 8 and of the application of the exciting signal.

Figure 7:
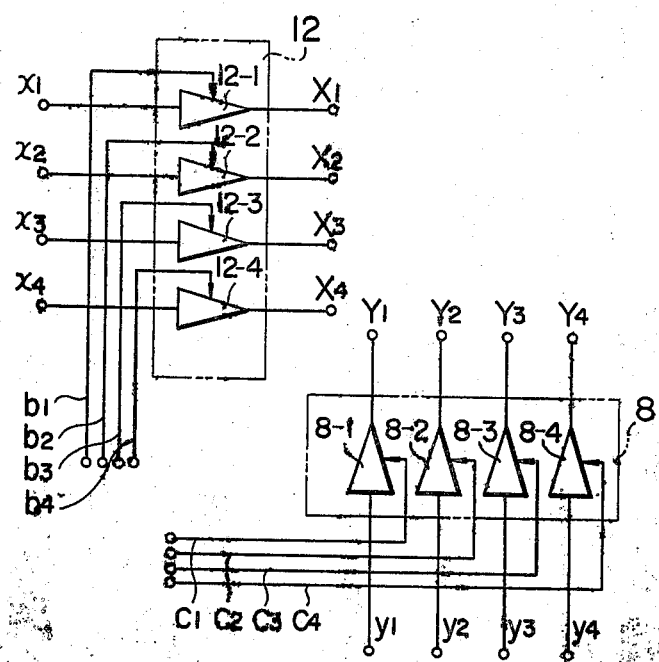
FIG. 7 is an arrangement view showing a modification of a portion of FIG. 5.

In FIG. 7, there is shown one form of an arrangement of such a driving circuit which comprises amplifiers 12-1 to 12-4 and 8-1 to 8-4 whose amplification factors vary in response to exciting signals $b_1$ to $b_4$ and $c_1$ to $c_4$, respectively.

Figure 8:
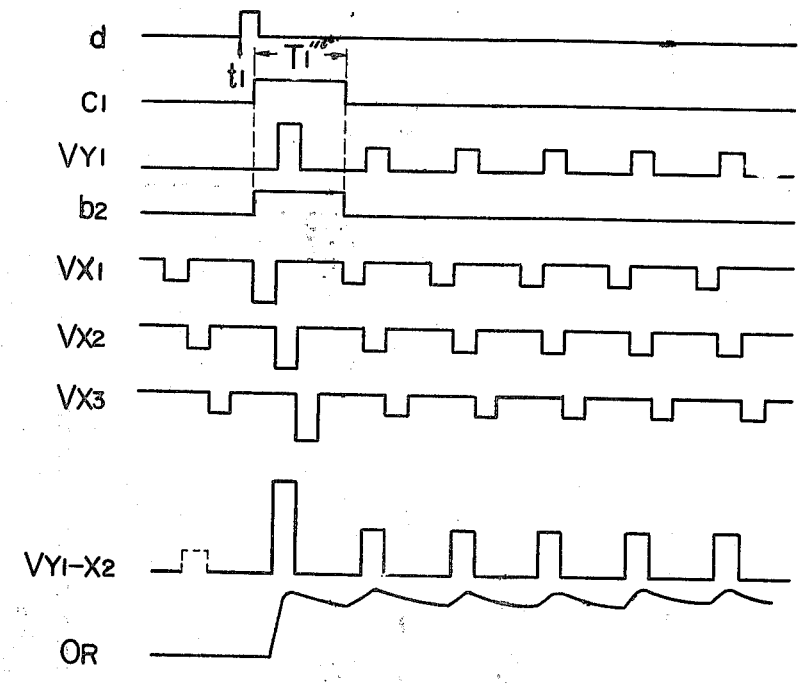
FIG. 8 is a waveform view of signals for illustrating the operation of FIG. 7.

FIG. 8 shows a waveform of a voltage at each part of FIG. 5 when it is replaced by the arrangement of FIG. 7. The waveforms are the same as those of FIG. 6 except that when the variation of the input display signal is detected, the amplitude of the voltage applied to each electrode of the liquid crystal display panel 9 is made larger to thereby make larger the amplitude of the terminal voltage applied to a predetermined liquid crystal cell.

As mentioned above, when the input display information varies, the liquid crystal cells over an area including the cell corresponding to the variation position of the display information are turned out to be excited, thereby permitting the liquid crystal display device to operate with a prompt response.

Figure 9:
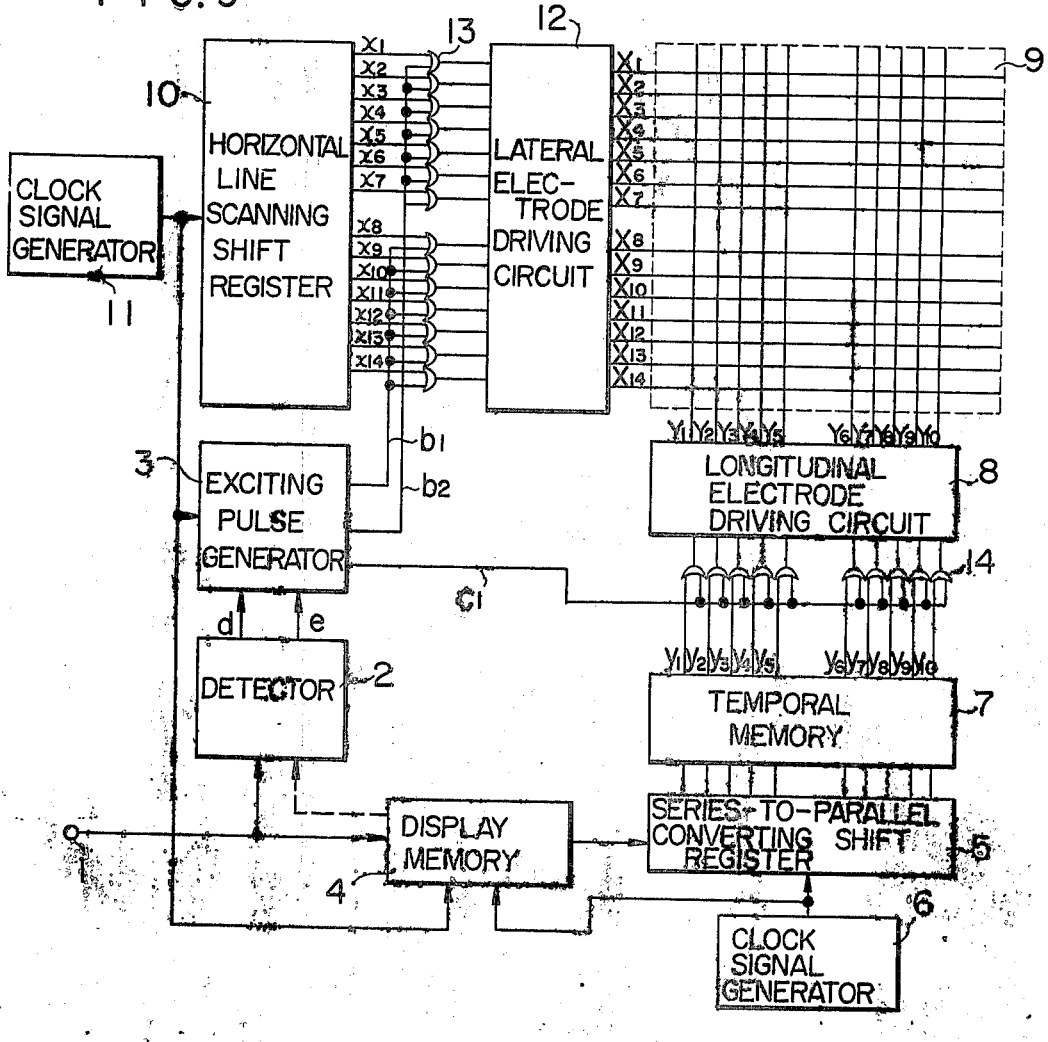
FIG. 9 is an arrangement view showing another embodiment of a liquid crystal panel driving device according to the present invention.

FIG. 9 shows an arrangement of another embodiment of the liquid crystal display panel driving device according to the present invention which is intended to effect a character display of four characters and in which a pulse having the longer duration is applied to the liquid crystal cell upon the variation of the character information to be displayed in order to force the liquid crystal cell to be excited.

Figure 10:
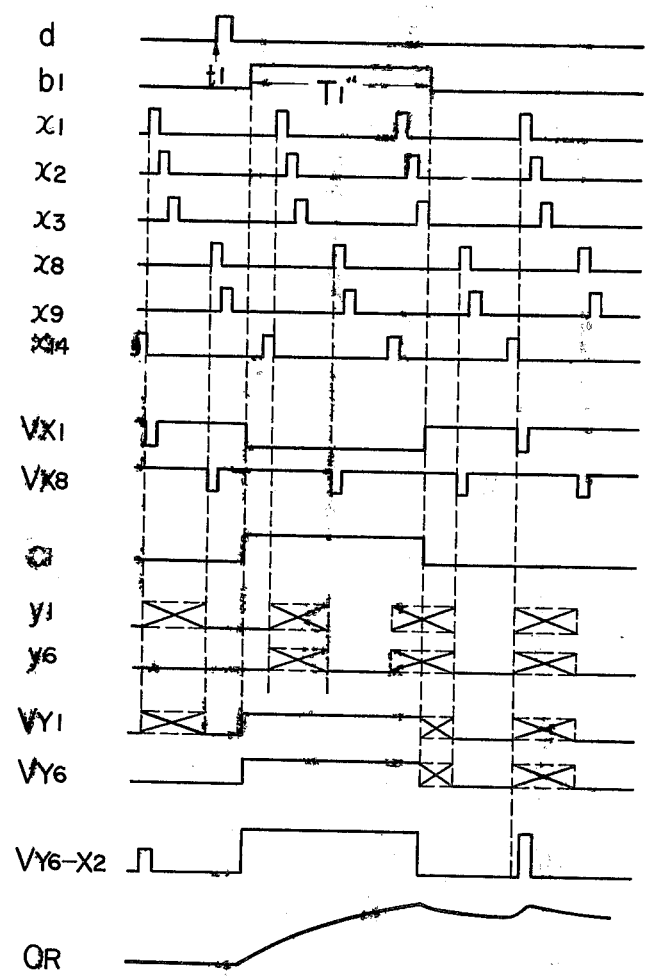
FIG. 10 is a waveform view of signals for illustrating the operation of FIG. 9.

FIG. 10 is a view of waveforms at the respective parts in FIG. 9 and shows that the liquid crystal display panel includes one written character at its above left portion prior to the time $t_1$ and has a further character written newly at its above right portion at the time $t_1$.

In FIG. 10, $V_Y-_X$ shows a voltage applied to a liquid crystal cell which lies at an intersection of electrodes $Y_6$ and $X_2$ and is intended for excitation, and OR shows an optical response of the cell.

In FIG. 9 it is assumed that the liquid crystal display panel 9 effects the display of four characters arranged in two rows and two columns, one character including 5 × 7, that is, 35 cells.

Thus, the liquid crystal display panel 9 comprises lateral electrodes $X_1$ to $X_7$ and $X_8$ to $X_{14}$, longitudinal electrodes $Y_1$ to $Y_5$ and $Y_6$ to $Y_{10}$, and accordingly the shift register 10 generates outputs $x_1$ to $x_7$ and $x_8$ to $x_{14}$ while the memory 7 generates outputs $y_1$ to $y_5$ and $y_6$ to $y_{10}$.

Further, for exciting signals applied to the driving circuit 12 there are used the exciting signals applied to the driving circuit 12 there are used the exciting signals $b_1$ and $b_2$ common to the longitudinal electrodes $X_1$ to $X_7$ and $X_8$ to $X_{14}$, respectively, and for exciting signals applied to the driving circuit 8 there is used the exciting signal $c_1$ common to the longitudinal electrodes $Y_1$ to $Y_{10}$.

In this arrangement, it is considered that the liquid crystal display panel 9 has the character already written in the above left portion and another character intended to be written in the above right portion. The detection of this fact by the detector 2 causes the exciting signals $b_1$ and $c_1$ having the longer duration as shown in FIG. 10 to be generated from the exciting pulse generator 3, the exciting signals being then applied to the lateral electrodes $X_1$ to $X_7$ and longitudinal electrodes $Y_1$ to $Y_{10}$ through the driving circuits 12 and 8, respectively.

Consequently, the liquid crystal display panel 9 has all the liquid crystal cells in the above left and above right portions excited during a period of $T_1''$. After disappearance of the compulsory exciting signal, the liquid crystal cell to be excited, for example, the cell at the intersection of the electrodes $Y_6$ and $X_2$ is kept excited without any change while the liquid crystal cell to be returned to a non-excited state is returned to the non-excited state in less than one second.

FIG. 11 shows a still another embodiment of a liquid crystal display panel driving device according to the present invention in which the position of the character to be written newly is scanned at a slow scanning speed during a predetermined period to make longer the duration of the pulse applied to the liquid crystal cell corresponding to that position.

The exciting pulse generator 3 generates a period pulse for scanning the portion at which the character is written newly within a predetermined period from the generation of the output signal from the detector 2. The pulse $b$ is then transmitted to the clock signal generator 11. The clock signal generator 11 causes the cycle of a clock signal $f$ to be varied in response to the input of the period pulse $b$, that is, to be made longer as far as the pulse $b$ is applied thereto. This permits the pulse duration of the signal to be longer which is generated from the shift register 10.

At the same time, the clock signal $f$ from the clock signal generator 11 is applied to the display memory 4 and the clock signal generator 6 to correspondingly vary the cycle of the clock signal from the clock signal generator 6.

This makes it possible to apply the voltage having the longer duration to the liquid crystal cell lying on the predetermined position of the liquid crystal display panel 9 and to force that cell to be excited.

Figure 12:
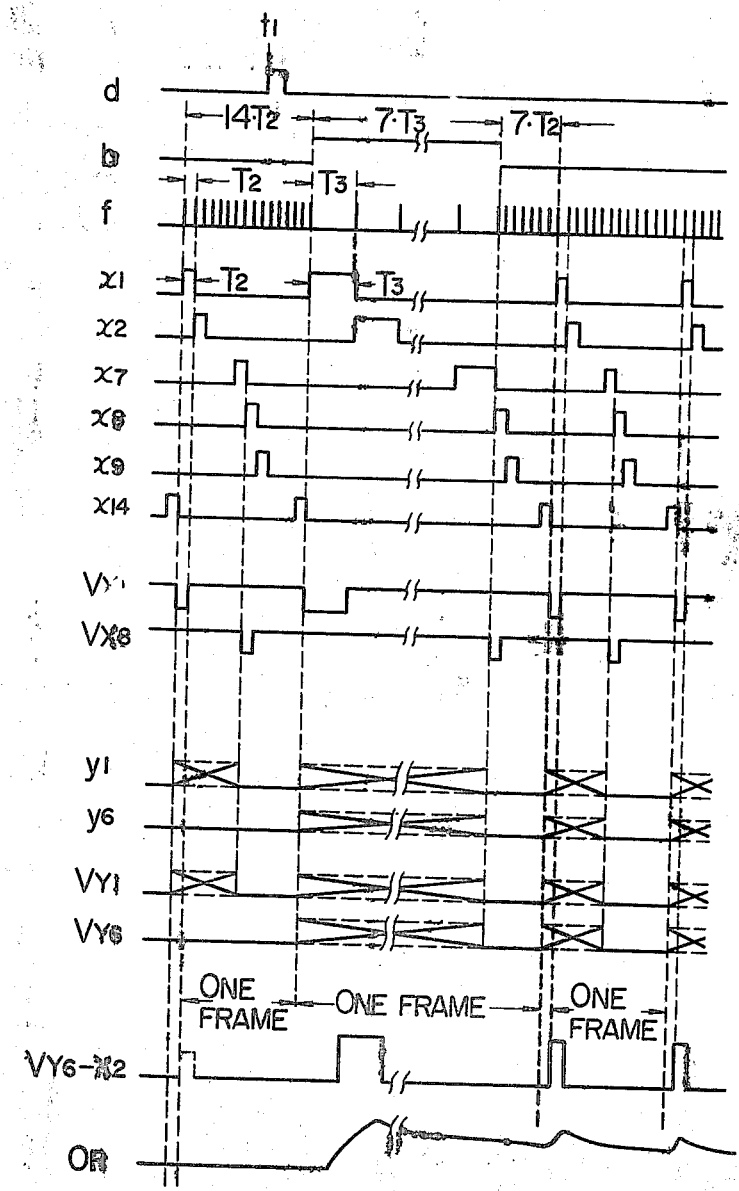
FIG. 12 is a waveform view of signals for illustrating the operation of FIG. 11.

FIG. 12 is a view of waveforms at the respective parts for illustrating the operation of the driving device of FIG. 11 and shows that the liquid crystal display panel 9 has the character written in the above left portion prior to the time $t_1$ and another character written in the above right portion at the time $t_1$ as is the same as in FIG. 10. $V_Y F_X$ shows a voltage applied only to the liquid crystal cell which lies at the intersection of the electrodes $Y_6$ and $X_2$ and is intended for excitation, and OR shows an optical response of the cell. Further, $b$ indicates an exciting signal from the exciting pulse generator 3 and $f$ indicates the clock signal from the clock signal generator 11.

In the use of the device of FIG. 11, though a period of time required for scanning is made longer in a predtermined period of time after the input of a signal representative of writing a new character, this causes no influence when the area of the display panel 9 is large and the number of characters to be displayed is great. This is because of a small ratio to the whole.

In the above-mentioned embodiments, the description has been made of the liquid crystal driven by the DC pulse, but it will apparent that the description is applicable similarly to an AC driving.

In brief, the predetermined liquid crystal cell is forced to receive the signal having the amplutide and duration necessary for compulsory excitation upon variation of the input display information.

As mentioned above, the present invention makes it possible to greatly reduce the time taken from the input of the signal to the display with the greatly reduced response time.

What is claimed is:

1. A liquid crystal display panel driving device comprising a display panel having thereon a plurality of liquid crystal cells to which exciting time-division signals are applied respectively, means for detecting the variation of display information to be displayed on said display panel, and means for applying, at least to the liquid crystal cell corresponding to the variation position of said display information, a signal for sufficiently exciting said liquid crystal cell when the variation of said display information is detected by said detecting means.

2. A liquid crystal display panel driving device as set forth in claim 1, wherein said applying means applies, to all liquid crystal cells on said liquid crystal display panel, a signal for sufficiently exciting said liquid crystal cells when the variation of the display information is detected by said detecting means.

3. A liquid crystal display panel driving device as set forth in claim 1, wherein said signal applied by said applying means has a duration longer than the duration of each of said time-division signals.

4. A liquid crystal display panel driving device as set forth in claim 1, wherein said signal applied by said applying means has an amplitude larger than the amplitude of each of said time-division signals.

5. A liquid crystal display panel driving device comprising a display panel in which a liquid crystal cell is formed at each intersection of a plurality of horizontal and vertical electrodes, horizontal driving means for successively applying scanning time-division signals to said horizontal electrodes respectively, vertical driving means for applying time-division signals to ones of said vertical electrodes corresponding to display information to be displayed on said display panel, detecting means for detecting the variation of said display information, and applying means for applying to said horizontal and vertical electrodes a predetermined signal so as to apply, at least to the liquid crystal cell corresponding to the variation position of said display information, a signal for sufficiently exciting said liquid crystal cell when the variation of said display information is detected by said detecting means.

6. A liquid crystal display panel driving device as set forth in claim 5, wherein said applying means comprises means for generating an exciting signal when the variation of said display information is detected, and means for applying the signal from said generating means to said horizontal and vertical driving means to apply, at least to the liquid crystal cell corresponding to the variation position of said display information, a signal for sufficiently exciting said liquid crystal cell.

7. A liquid crystal display panel driving device as set forth in claim 6, wherein said horizontal and vertical driving means include amplifying means which are provided correspondingly on said horizontal and vertical electrodes and whose amplification factors vary in response to the exciting signal from said generating means.

8. A liquid crystal display panel driving device comprises a display panel in which a liquid crystal cell is formed at each intersection of a plurality of horizontal and vertical electrodes, input means to which display information to be displayed on said display panel is applied, means for detecting the variation of said display information from said input means, means for generating first and second exciting signals when the variation of said display information is detected by said detecting means, first and second clock generating means for generating first and second clock signals respectively, a first shift register means shifted in response to said first clock signal to generate a predetermined scanning signal, first gate means for making a logic sum of said first exciting signal and said scanning signal, first driving means for applying signals to said horizontal electrodes of said display panel in response to the output from said first gate means, second shift register means for shifting display information from said input means, memory means for temporally storing the output from said second shift register means, second gate means for making a logic sum of the output signal from said memory means and said second exciting signal, and second driving means for applying signals to said vertical electrodes of said display panel in response to the output from said second gate means.

9. A liquid crystal display panel driving device as set forth in claim 8, further comprising display memory for storing the display information from said input means to apply a read-out output from said display memory to said second shift register means.

10. A liquid crystal display panel driving device as set forth in claim 5, wherein said applying means comprises means for generating an exciting signal when the variation of said display information is detected, and means for varying the cycle of the time-division signals applied to said horizontal and vertical electrodes of said display panel in response to the exciting signal from said generating means.

* * * * *